United States Patent
Lin et al.

(10) Patent No.: US 11,157,634 B2
(45) Date of Patent: Oct. 26, 2021

(54) DEVICE CONTROL METHOD AND APPARATUS

(71) Applicant: TENCENT TECHNOLOGY (SHENZHEN) COMPANY LIMITED, Shenzhen (CN)

(72) Inventors: Xiangyao Lin, Shenzhen (CN); Shihai Cheng, Shenzhen (CN); Liangliang Fan, Shenzhen (CN); Anqi Ren, Shenzhen (CN); Jingui Wang, Shenzhen (CN); Yuyan Long, Shenzhen (CN); Suipeng Qi, Shenzhen (CN); Bin Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 304 days.

(21) Appl. No.: 15/959,718

(22) Filed: Apr. 23, 2018

(65) Prior Publication Data
US 2018/0239913 A1 Aug. 23, 2018

Related U.S. Application Data

(63) Continuation of application No. PCT/CN2017/081604, filed on Apr. 24, 2017.

(30) Foreign Application Priority Data

Apr. 23, 2016 (CN) .......................... 201610255944.2

(51) Int. Cl.
*H04L 29/06* (2006.01)
*G06F 15/16* (2006.01)
(Continued)

(52) U.S. Cl.
CPC ............ *G06F 21/604* (2013.01); *G06F 21/52* (2013.01); *G06F 21/6218* (2013.01); *H04W 76/10* (2018.02); *H04W 4/80* (2018.02)

(58) Field of Classification Search
CPC .... G06F 21/604; G06F 21/52; G06F 21/6218; H04W 76/10
(Continued)

(56) References Cited

U.S. PATENT DOCUMENTS 8,001,208 B2 * 8/2011 Suzuki .................... H04L 29/06
709/217
9,774,608 B2 * 9/2017 Nakano .................. G08C 17/02
(Continued)

FOREIGN PATENT DOCUMENTS

CN 104219038 A 12/2014
CN 104375497 A 2/2015
(Continued)

OTHER PUBLICATIONS

Gerald Madlmayr, NFC Devices: Security and Privacy; IEEE:2008; p. 642-647.*
(Continued)

*Primary Examiner* — Monjur Rahim
(74) *Attorney, Agent, or Firm* — Oblon, McClelland, Maier & Neustadt, L.L.P.

(57) ABSTRACT

The disclosure describes a device control method. A close-range communication connection between a terminal and a target device is established. A feature description of the target device is obtained through the close-range communication connection. The feature description corresponds to a function of the target device. An operation permission regarding the feature description is queried. The function is
(Continued)

controlled by the terminal using the feature description according to the operation permission regarding the feature description.

20 Claims, 5 Drawing Sheets

(51) Int. Cl.
    *G06F 7/04*     (2006.01)
    *G06F 21/60*     (2013.01)
    *G06F 21/52*     (2013.01)
    *G06F 21/62*     (2013.01)
    *H04W 76/10*     (2018.01)
    *H04W 4/80*     (2018.01)

(58) Field of Classification Search
    USPC .............................................................. 726/4
    See application file for complete search history.

(56) References Cited

U.S. PATENT DOCUMENTS

| | | | |
|---|---|---|---|
| 10,554,745 B2* | 2/2020 | Yang | H04L 65/4076 |
| 2009/0013081 A1* | 1/2009 | Laroia | H04W 8/005 |
| | | | 709/228 |
| 2013/0282438 A1* | 10/2013 | Hunter | H04W 12/084 |
| | | | 705/7.32 |
| 2014/0106735 A1* | 4/2014 | Jackson | H05B 47/19 |
| | | | 455/419 |
| 2014/0323048 A1* | 10/2014 | Kang | H04W 76/14 |
| | | | 455/41.2 |
| 2014/0349579 A1* | 11/2014 | Zhou | H04L 63/0892 |
| | | | 455/41.2 |
| 2015/0201035 A1* | 7/2015 | Profit | H04L 67/16 |
| | | | 709/213 |
| 2015/0222517 A1* | 8/2015 | McLaughlin | G06F 21/445 |
| | | | 713/156 |
| 2016/0029148 A1* | 1/2016 | Jackson | H04W 8/005 |
| | | | 455/41.2 |
| 2016/0092943 A1* | 3/2016 | Vigier | G06Q 30/0281 |
| | | | 705/346 |
| 2018/0302773 A1* | 10/2018 | Jiao | H04W 76/10 |

FOREIGN PATENT DOCUMENTS

| | | |
|---|---|---|
| CN | 104957844 A | 2/2015 |
| CN | 104754501 A | 7/2015 |
| CN | 105228089 A | 1/2016 |
| CN | 105303083 A | 2/2016 |
| CN | 105956463 A | 9/2016 |
| WO | WO 2012/021633 A2 | 2/2012 |

OTHER PUBLICATIONS

International Search Report dated Jul. 27, 2017 issued in PCT/CN2017/081604 with English translation, 6 pages.
Chinese Office Action dated Mar. 29, 2018 in Chinese Patent Application No. 201610255944.2 with partial English translation, 13 pages.

* cited by examiner

DEVICE CONTROL METHOD AND APPARATUS

RELATED APPLICATION

This application is a continuation of International Application No. PCT/CN2017/081604, filed on Apr. 24, 2017 and entitled "DEVICE CONTROL METHOD, APPARATUS, AND STORAGE MEDIUM," which claims priority to Chinese Patent Application No. 201610255944.2, filed with the Chinese Patent Office on Apr. 23, 2016 and entitled "DEVICE CONTROL METHOD, APPARATUS, AND TERMINAL". The entire disclosures of the prior applications are hereby incorporated by reference in their entirety.

FIELD OF THE TECHNOLOGY

This application relates to the field of a device control method and apparatus.

BACKGROUND OF THE DISCLOSURE

With development of wireless communications technologies, an information exchange and control between a terminal and various devices may be performed by using close-range communication. For example, the information exchange and control between the terminal and a Bluetooth device may be performed by using a Bluetooth protocol. The Bluetooth device may be a Bluetooth earphone, an anti-lost device, an intelligent light, or the like. Various features of a Bluetooth device, such as on and off of an intelligent light, may be controlled by using an application program installed in the terminal. However, according to an existing Bluetooth protocol, during implementation of the close-range communication, a manufacturer who develops the Bluetooth device also develops a corresponding back-end service platform (e.g., a background service or a server), so that the terminal interacts with the back-end service platform developed by the manufacturer, thereby controlling the Bluetooth device developed by the manufacturer. By means of this manner, each manufacturer needs to independently develop a respective back-end service platform, and the terminal needs to connect to a plurality of back-end service platforms to control Bluetooth devices developed by different manufacturers, resulting in a waste of device resources, a complex communications network structure, and a complex control manner. In addition, the manufacturer needs to invest a great amount of human and material resources for developing and maintaining the back-end service platform, causing relatively high operating expenses and a relatively large workload.

SUMMARY

Aspects of the disclosure provide a device control method. A close-range communication connection between a terminal and a target device is established. A feature description of the target device is obtained through the close-range communication connection. The feature description corresponds to a function of the target device. An operation permission regarding the feature description is queried. The function is controlled by the terminal using the feature description according to the operation permission regarding the feature description.

In an embodiment, the operation permission includes at least one of write permission for the feature description, read permission for the feature description, and permission for being informed automatically regarding an update of the feature description.

In an embodiment, the operation permission includes the permission for being informed automatically regarding the update of the feature description. The controlling the function using the feature description includes subscribing to the feature description from the target device according to the operation permission, so that when the target device updates the feature description, the terminal is automatically informed.

In an embodiment, the operation permission includes the read permission for the feature description. The controlling the function using the feature description includes reading the feature description according to the operation permission, and displaying, on the terminal, information about the function corresponding to the feature description.

In an embodiment, the operation permission includes the write permission for the feature description. The controlling the function using the feature description includes, when receiving a control instruction associated with the feature description, performing a write operation on the feature description according to the operation permission regarding the feature description and the control instruction, so that the target device controls the function corresponding to the control instruction.

In an embodiment, before the establishing the close-range communication connection between the terminal and the target device, a broadcast packet of the target device is received, the broadcast packet carrying a target identifier of the target device. Whether the target identifier matches an identifier in a preset identifier library is determined. When the target identifier is determined to match the identifier in the preset identifier library, the close-range communication connection is established between the terminal and the target device. A device associated with the identifier in the preset identifier library is an authorized device.

In an embodiment, the target device is a pedometer, a Bluetooth light, or a Bluetooth scale.

In an embodiment, the target device is a pedometer, the feature description is a real-time step count information feature description or a movement goal feature description. When the feature description is the real-time step count information feature description, the operation permission includes a read permission for the real-time step count information and a permission for being informed automatically regarding an update of the real-time step count information. When the feature description is the movement goal feature description, the operation permission includes a write permission for the movement goal, a read permission for the movement goal, and a permission for being informed automatically regarding an update of the movement goal.

Aspects of the disclosure provide a terminal that includes a network interface and a processor coupled with the network interface. The processor establishes through the network interface a close-range communication connection between the terminal and a target device. The processor obtains, through the close-range communication connection, a feature description of the target device. The features description corresponds to a function of the target device. The processor queries an operation permission regarding the feature description. Moreover, the processor controls the function using the feature description according to the operation permission regarding the feature description.

In an embodiment, the operation permission includes at least one of a write permission for the feature description, a read permission for the feature description, and a permission for being informed automatically regarding an update of the feature description.

In an embodiment, the operation permission includes the permission for being informed automatically regarding the update of the feature description. The processor subscribes to the feature description from the target device according to the operation permission, so that when the target device updates the feature description, the terminal is automatically informed.

In an embodiment, the operation permission includes the read permission for the feature description. The processor reads the feature description according to the operation permission, and displays, on the terminal, information about the function corresponding to the feature description.

In an embodiment, the operation permission includes the write permission for the feature description. The processor, when receiving a control instruction associated with the feature description, performs a write operation on the feature description according to the operation permission regarding the feature description and the control instruction, so that the target device controls the function corresponding to the control instruction.

In an embodiment, the processor receives a broadcast packet of the target device, the broadcast packet carrying a target identifier of the target device. The processor determines whether the target identifier matches an identifier in a preset identifier library, and, when the target identifier is determined to match the identifier in the preset identifier library, establishes the close-range communication connection between the terminal and the target device. A device associated with the identifier in the preset identifier library is an authorized device.

In an embodiment, the target device is a pedometer, a Bluetooth light, or a Bluetooth scale.

In an embodiment, the target device is a pedometer, and the feature description is a real-time step count information feature description or a movement goal feature description. When the feature description is the real-time step count information feature description, the operation permission includes a read permission for the real-time step count information and a permission for being informed automatically regarding an update of the real-time step count information. When the feature description is the movement goal feature description, the operation permission includes a write permission for the movement goal, a read permission for the movement goal, and a permission for being informed automatically regarding an update of the movement goal.

Aspects of the disclosure provide a non-transitory computer readable storage medium storing a computer readable program which, when executed by a processor of a terminal, causes the processor to perform various operations. A close-range communication connection is established between the terminal and a target device. A feature description of the target device is obtained through the close-range communication connection. The feature description corresponds to a function of the target device. An operation permission regarding the feature description is queried. The function is controlled by the terminal using the feature description according to the operation permission regarding the feature description.

In an embodiment, the operation permission includes at least one of a write permission for the feature description, a read permission for the feature description, and a permission for being informed automatically regarding an update of the feature description.

In an embodiment, the operation permission includes the permission for being informed automatically regarding the update of the feature description. The controlling the function using the feature description includes subscribing to the feature description from the target device according to the operation permission, so that when the target device updates the feature description, the terminal is automatically informed.

In an embodiment, the operation permission includes the read permission for the feature description. The controlling the function using the feature description includes reading the feature description according to the operation permission, and displaying, on the terminal, information about the function corresponding to the feature description.

In accordance with some embodiments of this application, a close-range communication connection between a terminal and a target device is established, and at least one feature description of the target device is obtained through the close-range communication connection, a feature description corresponding to a function of the target device. An operation permission for the feature description is queried, and the function is controlled by the terminal using the feature description according to the operation permission regarding the feature description. By means of this manner, the function corresponding to the feature description can be controlled only by the terminal by performing an operation on the feature description of the target device without needing to develop a back-end service platform by a manufacturer who develops the target device, thereby saving device resources, simplifying a communications network structure, and simplifying a control manner.

BRIEF DESCRIPTION OF THE DRAWINGS

To more clearly describe the technical solutions in the embodiments of this application, the following briefly describes the accompanying drawings for describing the embodiments. The accompanying drawings in the following description merely show some embodiments of this application, and a person of ordinary skill in the art may still derive other drawings from these accompanying drawings in view of the embodiments illustrated herein.

DESCRIPTION OF EMBODIMENTS

The following describes the technical solutions in the embodiments of this application with reference to the accompanying drawings of this application. The described embodiments are merely some embodiments of this application rather than all of the embodiments. All other embodiments obtained by persons of ordinary skill in the art based on the embodiments of this application shall fall within the scope of this application.

A device control method according to an embodiment of this application is described below in detail with reference to FIG. 1 to FIG. 3.

Figure 1:
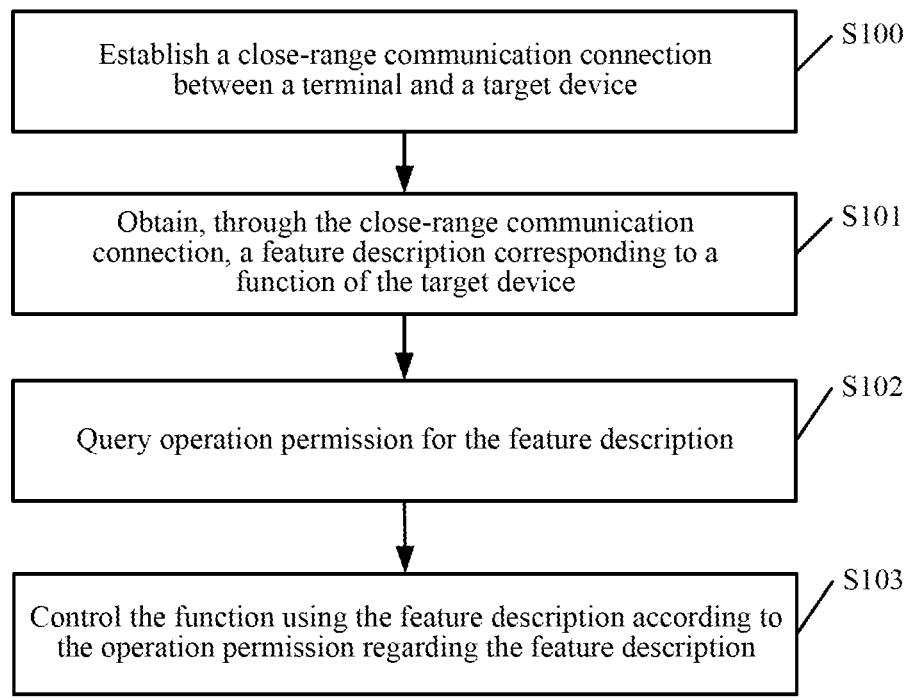
FIG. 1 is a flowchart of a device control method according to an embodiment of this application.

FIG. 1 is a flowchart of a device control method according to an embodiment of this application. The device control method provided in this embodiment of this application may be implemented on a terminal, for example, implemented by using hardware of the terminal in combination with an application program installed in the terminal. Referring to FIG. 1, the method may include the following steps S100 to S103:

In Step S100: a close-range communication connection between a terminal and a target device is established.

In this embodiment of this application, the terminal may be a portable terminal device such as a mobile phone, a tablet computer (PAD), or an intelligent wearable device. An application program may be installed and may run in the terminal. The application program may include, but not limited to, a social networking service (SNS) application program, an instant messaging application program, and the like.

A target device may be a device capable of broadcasting or transmitting a close-range communication signal. The target device including, but being not limited to, a Bluetooth low energy (BLE) device or a Near-Field Communication (NFC) device. The terminal may also have a close-range communication function, so that the close-range communication between the terminal and the target device may be implemented. The target device may be a pedometer, a Bluetooth earphone, a Bluetooth light, a Bluetooth scale, or the like.

The target device may broadcast or transmit a close-range communication signal according to a particular recurring interval (for example, 1 minute or 5 minutes), and carry a device identifier in the close-range communication signal. A user who uses the terminal may enable the close-range communication function of the terminal, so that the terminal can obtain the close-range communication signal broadcast by the target device, and extract the device identifier from the close-range communication signal. The close-range communication signal may include, but is not limited to, a BLE signal or an NFC signal. The BLE signal is a low-cost, short-distance, and interoperable robust wireless signal, and a distance between two communication parties is required to meet a certain requirement to achieve super-low energy consumption. The NFC signal is a short-distance and high-frequency wireless signal.

In this embodiment of this application, the target device may broadcast a broadcast packet. The broadcast packet carries an identifier, which is referred to as service uuid (Universally Unique Identifier) that identifies a service provided by the target device. For example, the service uuid of the service provided by the target device may be 0xFEE7. The broadcast packet may further include a manufacturer specific data field that is defined by a manufacturer. The field carries a Media Access Control (MAC) address of the target device. The manufacturer specific data field has a length longer than or equal to 8 bytes. First two bytes are an identifier, which is referred to as company id that identifies the manufacturer who produces the target device. Also, the last six bytes include the MAC address of the target device. In this embodiment of this application, if there is no company id, any value may be assigned to the first two bytes. If the manufacturer specific data field further includes other bytes in addition to the company id and the MAC address, content of the bytes may be defined and assigned by the manufacturer.

When the terminal establishes the close-range communication connection with the target device for the first time, an association relationship between the terminal and the target device is established, and both the terminal and the target device store the association relationship. After the terminal establishes the association relationship with the target device, when the terminal detects signals from the target device again, the terminal automatically establishes the close-range communication connection with the target device.

Step S101: Obtain, through the close-range communication connection, at least one feature description of the target device, a feature description corresponding to a function of the target device.

The feature description of the target device may be configured according to the function of the target device. For example, if the target device is a pedometer, two feature descriptions may be included. One feature description is a real-time step count information feature description, including a step count, a distance, calories, and the like. The other feature description is a movement goal feature description. A step count profile formed by the two feature descriptions is carried under the service uuid of the service provided by the target device in the broadcast packet. Generally, if the target device is capable of providing one or more services, the step count profile includes the one or more services. Each service may include one or more feature descriptions.

After establishing the close-range communication connection relationship with the target device, the terminal sends a feature description query request to the target device, the query request carrying a specified feature description. The target device returns a response indicating whether the specified feature description exists to the terminal. If the specified feature description exists, the terminal obtains the specified feature description.

In this embodiment of this application, the terminal may read the at least one feature description of the target device through the close-range communication connection. The feature description corresponds to a function of the target device. The target device may have a plurality of feature descriptions. To help the terminal to determine a type of the target device, the terminal may further read an identifier of the target device, and determine the type of the target device according to the identifier of the target device. For example, the type of the target device may be respectively represented by using identifiers 1 to 100, and the identifier 3 indicates a pedometer. When reading that the identifier of the terminal is 3, the terminal determines that the target device is a pedometer. Feature descriptions of target devices of different types correspond to different functions.

For a terminal using the iOS system, when software of the iOS system is connected to a target device, another application program installed in the terminal cannot obtain a MAC address of the target device. Therefore, the terminal queries the target device, and the target device returns a feature description to the terminal. For example, a read feature description is returned to the terminal by adding the read feature description with a service uuid, where an identifier uuid of the read feature description is 0xFEC9, and its content includes a 6-byte MAC address. The application program installed in the terminal reads the feature description, to determine the MAC address of the target device. In this way, when being connected to a plurality of devices, the terminal may distinguish between the target device and another device according to the MAC address.

Step S102: Query an operation permission regarding the feature description.

In this embodiment of this application, the operation permission for the feature description is queried. The operation permission includes at least one of a write permission (write) for the feature description, a read permission (read) for the feature description, and a permission (indicate/notify) for being informed automatically regarding an update of the feature description. In some examples, the target device automatically informs an update of the feature description by automatically indicating the update or notifying the update. In some examples, the update of the feature description is more reliably communicated from the target device to the terminal by indicating than by notifying.

Herein, still using the example in which the target device is the pedometer, and the pedometer uses feature descriptions including the real-time step count information feature description and the movement goal feature description.

The following Table 1 describes the real-time step count information feature description. In Table 1, a name of the real-time step count information feature description is current pedometer measurement, and an identifier uuid is 0xFEA1. Operation permission of a user for the feature description includes a read permission and a permission for being informed automatically regarding an update of the feature description. Real-time step count information feature description includes a step count, a distance, and calories.

TABLE 1

| | |
|---|---|
| Feature name | current_pedometer_measurement |
| uuid | 0xFEA1 |
| Operation permission | Read; one or both of Indicate and Notify may be supported |
| Whether mandatory | Mandatory |
| Description | Real-time step count information, including a step count, a distance, and calories |

The following Table 2 describes the movement goal feature description. In Table 2, a name of the movement goal feature description is target, and an identifier uuid is 0xFEA2. Operation permission of a user for the feature description includes a read permission, a write permission, and a permission for automatically notifying an update of the feature description.

TABLE 2

| | |
|---|---|
| Feature name | target |
| uuid | 0xFEA2 |
| Operation permission | Read; Write; and Indicate |
| Whether mandatory | Optional |
| Description | Movement goal |

The operation permission of the terminal for each feature description of the target device may be preset by the target device. When exchanging information with the target device by using the communication connection, the terminal may read the feature description and the operation permission that are preset in the target device. Certainly, the feature description of the target device and the operation permission for the feature description may alternatively be preset in the application program of the terminal. When the feature description of the target device is detected, the operation permission for the feature description of the target device may be queried in the application program of the terminal.

In this embodiment of this application, a value of the real-time step count information feature description current pedometer measurement may be formed by the following four parts, as shown in Table 3.

TABLE 3

| Value | Type | Description |
|---|---|---|
| Flag | Uint8 | 0x01: Step count (mandatory) 0x02: Distance (optional) 0x04: Calories (optional) For example, 0x05 indicates that a step count and calories are included |
| StepCount | Uint24 | Step count |
| StepDistancer | Uint24 | Distance, in meters |
| StepCalorie | Uint24 | Calories |

A flag bit Flag is used to mark whether a step count StepCount, a distance StepDistancer, and calories StepCalorie are mandatory or optional. The step count and the calories are optional, that is, the step count and the calories may be included or not included in the value of the real-time step count information feature description returned by the target device to the terminal. If the value of the real-time step count information feature description returned by the target device to the terminal includes only the step count, a returned value is: 01 (value: 0x01, which indicates a step count) 10 27 00 (value: 0x2710, which is a hexadecimal number and indicates 10000 steps). If the value of the real-time step count information feature description returned by the target device to the terminal includes the step count and the distance, a returned value is: 03 (value: 0x03, which indicates a step count and a distance) 10 27 00 (value: 0x2710, which is a hexadecimal number and indicates 10000 steps) 70 17 00 (value: 0x1770, which is a hexadecimal number and indicates 6000 meters). The rest can be deduced by analogy.

In this embodiment of this application, a value of the movement goal feature description target may be formed by values in the following table, as shown in Table 4.

TABLE 4

| Value | Type | Description |
|---|---|---|
| Flag | Uint8 | 0x01: Step count (mandatory) |
| StepCount | Uint24 | Step count |

A flag bit Flag is used to mark that a step count StepCount is mandatory. If a movement goal is 10000 steps, the value of the target is: 01 (value: 0x01, which indicates a step count) 10 27 00 (value: 0x2710, which is a hexadecimal number and indicates 10000 steps).

In some examples, if the terminal writes the value of the movement goal target into the target device, the target device will update the value. In some examples, if the target device updates the value of the movement goal target, the terminal will be notified.

Step S103: Controlling the function using the feature description according to the operation permission regarding the feature description.

In this embodiment of this application, the terminal may perform an operation on the feature description of the target device according to the operation permission for the feature description, to control the function corresponding to the feature description.

In this embodiment of this application, if the operation permission includes the permission for being informed automatically regarding an update of the feature description, the performing an operation on the feature description according to the operation permission, to control the function corresponding to the feature description includes:

subscribing to the feature description from the target device according to the operation permission, so that when the target device updates the feature description, the terminal is automatically informed.

In this embodiment of this application, if the operation permission for a particular feature description includes the permission for being informed automatically regarding an update of the feature description, the terminal may subscribe to the feature description from the target device, so that the target device informs the terminal in time when the feature description is updated. Generally, a device includes many feature descriptions, and a user can subscribe to a corresponding feature description according to a requirement of the user. In this way, when the subscribed feature description is updated, the target device automatically informs the terminal.

For example, for the real-time step count information feature description in the pedometer, if a user subscribes to the feature description, when the real-time step count information feature description is updated, the target device synchronizes the updated information with the terminal and informs the user. There are various manners for informing the update of a feature description. For example, the updated information may be displayed on an interface of the pedometer, and displayed content includes, but is not limited to, a step count, a distance, and calories. Similarly, the user may also subscribe to the movement goal feature description. When updating the feature description, the target device automatically synchronizes an updated value with the terminal and notifies the user.

In this embodiment of this application, if the operation permission includes the read permission for the feature description, the performing an operation on the feature description according to the operation permission, to control the function corresponding to the feature description includes:

reading the feature description according to the operation permission; and displaying, on the terminal, information about the function corresponding to the feature description.

In this embodiment of this application, if the operation permission for a particular feature description includes the read permission for the feature description, the terminal may read the feature description according to the operation permission, and displays the information about the function corresponding to the feature description on the terminal.

For example, when finding that the terminal has read permission for the real-time step count information feature description in the pedometer, the terminal may send a read request to the target device according to the read permission, to read current real-time step count information of target device. The real-time step count information includes, but is not limited to, a step count, a distance, calories, and the like. The terminal may display the read real-time step count information, to help the user to learn a current movement status. Similarly, if the terminal has read permission for the movement goal feature description, the terminal may read a value of the movement goal from the target device, and display the value of the movement goal.

In this embodiment of this application, if the operation permission includes the write permission for the feature description, the performing an operation on the feature description according to the operation permission, to control the function corresponding to the feature description includes:

when receiving a control instruction associated with the feature description, performing a write operation on the feature description according to the operation permission regarding the feature description and the control instruction, so that the target device controls the function corresponding to the control instruction.

In this embodiment of this application, if the operation permission for a particular feature description includes the write permission for the feature description, for example, the movement goal feature description in the pedometer, the terminal has the write permission for the feature description. When receiving the control instruction associated with the feature description, the terminal performs the write operation on the feature description in the target device according to the write permission for the feature description and the control instruction, so that the target device controls the function corresponding to the control instruction.

For example, when finding that the terminal has a read permission for the movement goal feature description in the pedometer, the terminal may send a read request to the target device according to the read permission, to obtain a value of a movement goal that is currently stored in the target device. When the terminal finds that the terminal has a write permission for the feature description and the user needs to reset the movement goal in the target device by using the terminal, the user initiates a control instruction associated with the movement goal feature description to the terminal, the control instruction carrying a value of a new movement goal. In some examples, the terminal sends the value of the new movement goal to the target device, and the target device updates the stored value of the movement goal. In this embodiment of this application, a manner of initiating the control instruction by the user to the terminal may be that the user performs a setting operation on the feature description by using a touchscreen of the terminal.

The terminal performs a modification operation on the movement goal feature description in the target device according to the control instruction and the write permission for the movement goal feature description, to modify the movement goal feature description to the value of the movement goal that is carried in the control instruction, so that the movement goal in the target device is updated.

In this embodiment of this application, a close-range communication connection between a terminal and a target device is established; at least one feature description of the target device is obtained based on the close-range communication connection, a feature description corresponding to a function of the target device; operation permission for each of the at least one feature description is queried; and an operation is performed on the feature description according to the operation permission, to control the function corresponding to the feature description. By means of this manner, the function corresponding to the feature description can be controlled only by the terminal by performing an operation on the feature description of the target device without needing to develop a back-end service platform by a manufacturer who develops the target device, thereby saving device resources, simplifying a communications network structure, and simplifying a control manner.

Figure 2:
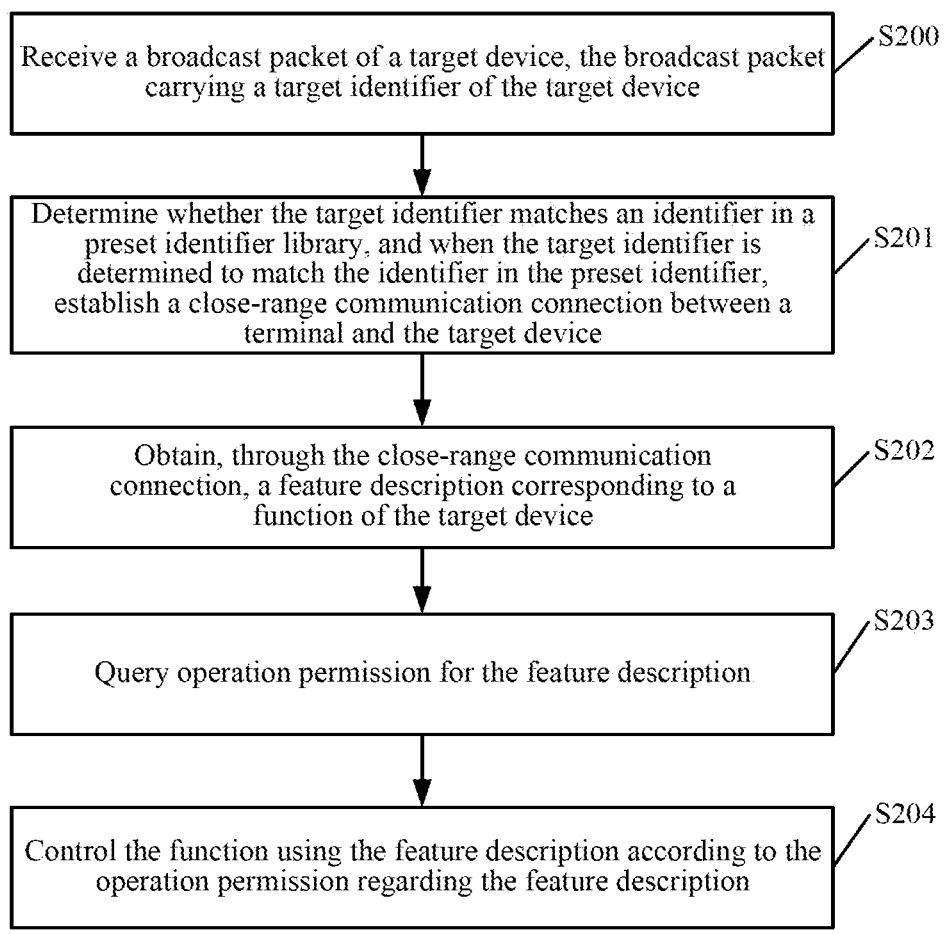
FIG. 2 is a flowchart of another device control method according to an embodiment of this application.

FIG. 2 is a flowchart of another device control method according to an embodiment of this application. The device control method provided in this embodiment of this application may be implemented on a terminal, for example, implemented by using hardware of the terminal in combination with an application program installed in the terminal. Referring to FIG. 2, the method may include the following steps S200 to S204:

S200: Receive a broadcast packet of a target device, the broadcast packet carrying a target identifier of the target device.

In this embodiment of this application, the target device broadcasts the broadcast packet. The broadcast packet carries the target identifier of the target device, and the target identifier may include a MAC address, a network address, or the like of the target device.

S201: Determine whether the target identifier matches an identifier in a preset identifier library, and when the target identifier is determined to match the identifier in the preset identifier library, establish a close-range communication connection between a terminal and the target device.

A device marked by the identifier in the preset identifier library is an authorized device.

In this embodiment of this application, a new security mechanism is further added based on a security mechanism of an original Bluetooth protocol, that is, whether the target device is an authorized device is determined by matching the target identifier of the target device with the identifier in the preset identifier library. Because a device marked by the identifier in the preset identifier library is an authorized device, if the preset identifier library has the identifier matching the target identifier, it indicates that target device is an authorized device, so that the terminal can establish the close-range communication connection with the target device.

Each device manufacturer records in advance, on an html page provided by the manufacturer, an identifier of a device that the manufacturer produces. In this way, the identifier of the device is automatically recorded in a preset identifier library of a back-end service platform (e.g., on a server).

After receiving the broadcast packet of the target device, the terminal verifies whether the target device is authorized in the preset identifier library of the back-end service platform. If it is found that the identifier of the target device is not recorded in the preset identifier library, it is considered that the target device is unauthorized. In addition, if an identifier has been embezzled in a large scale by a pirating manufacturer, a blacklist may also be configured in the back-end service platform, to disable a device marked by the identifier.

Step S202: Obtain, through the close-range communication connection, at least one feature description of the target device, a feature description corresponding to a function of the target device.

Step S203: Query operation permission regarding the feature description.

Step S204: Control the function using the feature description according to the operation permission regarding the feature description.

For specific implementations of step S202 to step S204 in this embodiment of this application, refer to step S101 to step S103 of the embodiment shown in FIG. 1.

In this embodiment of this application, a close-range communication connection between a terminal and a target device is established; at least one feature description of the target device is obtained through the close-range communication connection, a feature description corresponding to a function of the target device; operation permission regarding the feature description is queried; and the function is controlled using the feature description according to the operation permission regarding the feature description. By means of this manner, the function corresponding to the feature description can be controlled only by the terminal by performing an operation on the feature description of the target device without needing to develop a back-end service platform by a manufacturer who develops the target device, thereby saving device resources, simplifying a communications network structure, and simplifying a control manner.

Figure 3:
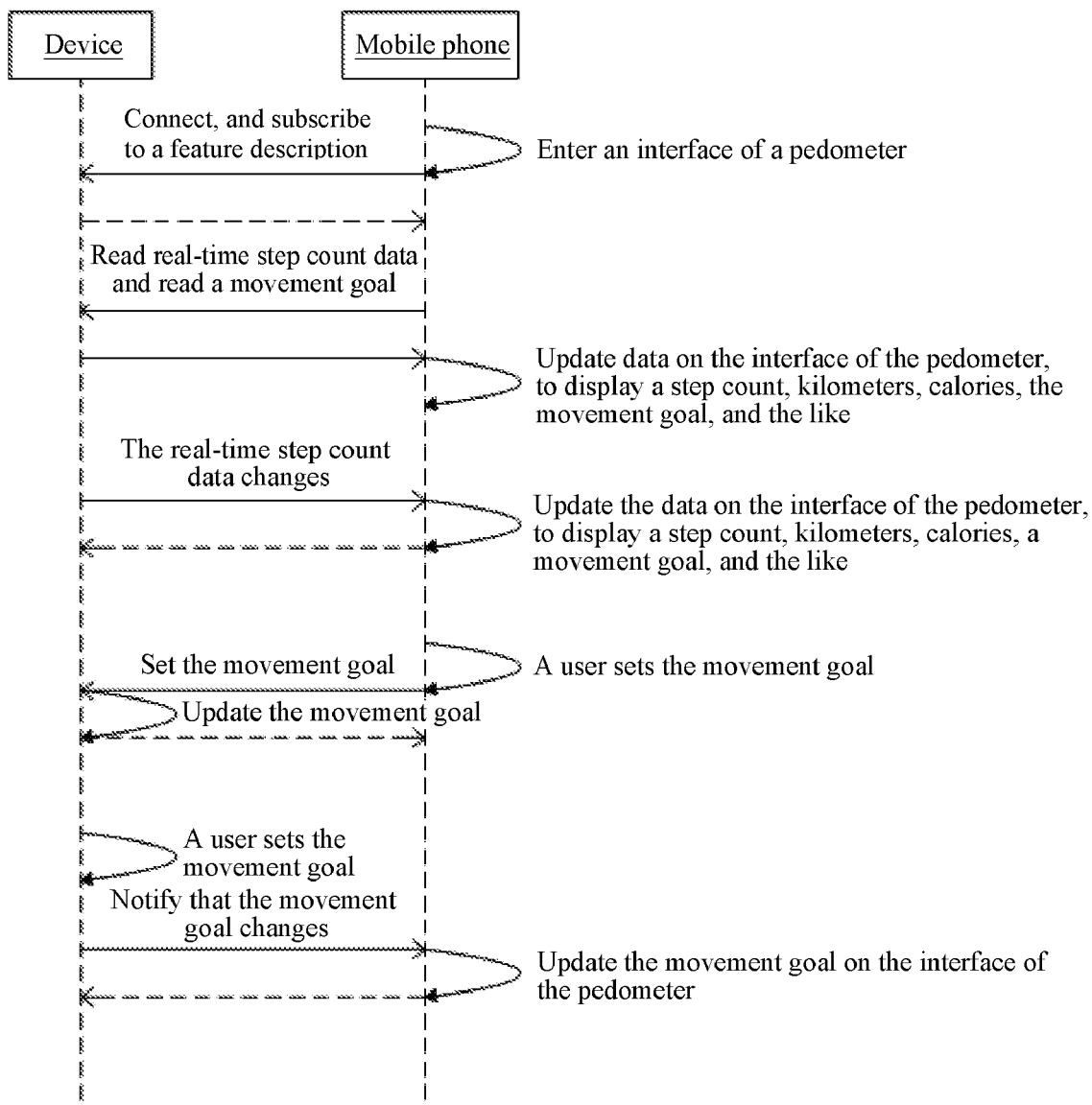
FIG. 3 is a signal diagram of an information exchange between a device and a mobile phone according to an embodiment of this application.

FIG. 3 is a signal diagram of an information exchange between a mobile phone and a device according to an embodiment of this application. This embodiment of this application is described by using an example in which the device is a pedometer and a terminal is the mobile phone, as shown in FIG. 3.

The mobile phone enters an interface of the pedometer, establishes a close-range communication connection with the device (that is, the pedometer), and subscribes to a corresponding feature description from the device.

The mobile phone may read the feature description such as real-time step count data or a movement goal from the device.

The mobile phone updates data on the interface of the pedometer according to the read feature description, to display a step count, distance (e.g., in unit of meter), calories, and the movement goal.

When the real-time step count data recorded in the device changes, the device automatically informs the mobile phone of changed real-time step count data.

The mobile phone updates the data on the interface of the pedometer, to display an updated step count, updated distance (e.g., in unit of meter), and updated calories.

A user may alternatively set the movement goal in the device by using the mobile phone, that is, perform a write operation on a movement goal feature description in the device by using the mobile phone.

The device automatically updates the movement goal according to the write operation of the mobile phone, and informs the mobile phone of an updated movement goal.

The user may alternatively set the movement goal on the device, and after the user sets the movement goal on the device, the device automatically informs the mobile phone of a set movement goal.

The mobile phone updates the interface of the pedometer, to display the updated movement goal.

A device control apparatus according to an embodiment of this application is described below in detail with reference to FIG. 4 and FIG. 5.

Figure 4:
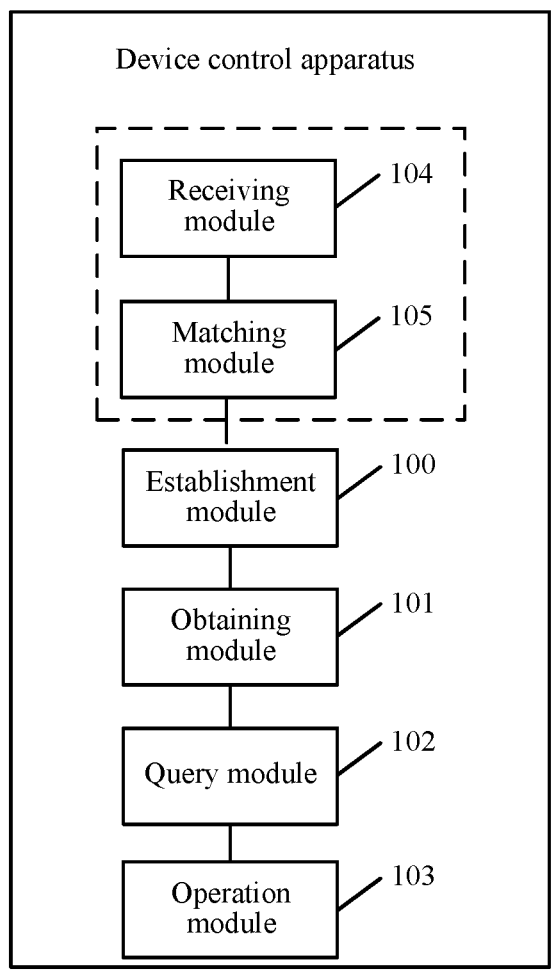
FIG. 4 is a block diagram of a device control apparatus according to an embodiment of this application.

FIG. 4 is a block diagram of a device control apparatus according to an embodiment of this application. As shown in FIG. 4, the device control apparatus includes an establishment module 100, an obtaining module 101, a query module 102, and an operation module 103. In some embodiments, the device control apparatus in this disclosure is a terminal or embedded in a terminal.

The establishment module 100 is configured to establish a close-range communication connection between a terminal and a target device.

In this embodiment of this application, the terminal may be a portable terminal device such as a mobile phone, a tablet computer (PAD), or an intelligent wearable device. An application program may be installed and may run in the terminal. The application program may include, but not limited to, a social networking service (SNS) application program, an instant messaging application program, and the like.

A target device may be a device capable of broadcasting or transmitting a close-range communication signal, the target device including, but being not limited to, a BLE device or an NFC device, and the terminal may also have a close-range communication function, so that the close-range communication between the terminal and the target device may be implemented. The target device may be a pedometer, a Bluetooth earphone, a Bluetooth light, a Bluetooth scale, or the like.

The target device may broadcast or transmit a close-range communication signal according to a particular recurring interval (for example, 1 minute or 5 minutes), and carry a device identifier in the close-range communication signal. A user who uses the terminal may enable the close-range communication function of the terminal, so that the terminal can obtain the close-range communication signal broadcast by the target device, and extract the device identifier from the close-range communication signal. The close-range communication signal may include, but is not limited to, a BLE signal or an NFC signal. The BLE signal is a low-cost, short-distance, and interoperable robust wireless signal, and a distance between two communication parties is required to meet a certain requirement to achieve super-low energy consumption. The NFC signal is a short-distance and high-frequency wireless signal.

In this embodiment of this application, the target device may broadcast a broadcast packet. The broadcast packet carries an identifier, which is referred to as service uuid that identifies a service provided by the target device. For example, the service uuid of the service provided by the target device may be 0xFEE7. The broadcast packet further includes a manufacturer specific data field that is defined by a manufacturer. The field carries a MAC address of the target device. The manufacturer specific data field has a length longer than or equal to 8 bytes. First two bytes are an identifier, which is referred to as company id that identifies the manufacturer who produces the target device. Also, the last six bytes include the MAC address of the target device. In this embodiment of this application, if there is no company id, any value may be assigned to the first two bytes. If the manufacturer specific data field further includes other bytes in addition to the company id and the MAC address, the bytes may be defined and assigned by the manufacturer.

When the terminal establishes the close-range communication connection with the target device for the first time, an association relationship between the terminal and the target device is established, and both the terminal and the target device store the association relationship. After the terminal establishes the association relationship with the target device, when the terminal detects signals from the target device again, the terminal automatically establishes the close-range communication connection with the target device.

The obtaining module 101 is configured to obtain, through the close-range communication connection, at least one feature description of the target device, a feature description corresponding to a function of the target device.

After establishing the close-range communication connection relationship with the target device, the terminal sends a feature description query request to the target device, the query request carrying a specified feature description. The target device returns a response indicating whether the specified feature description exists to the terminal. If the specified feature description exists, the terminal obtains the specified feature description.

In this embodiment of this application, the terminal may read the feature description of the target device through the close-range communication connection. The feature description corresponds to a function of the target device. The target device may have a plurality of feature descriptions. To help the terminal to determine a type of the target device, the terminal may further read an identifier of the target device, and determine the type of the target device according to the identifier of the target device. For example, the type of the target device may be respectively represented by using identifiers 1 to 100, and the identifier 3 indicates a pedometer. When reading that the identifier of the terminal is 3, the terminal determines that the target device is a pedometer. Feature descriptions of target devices of different types correspond to different functions.

For a terminal using the iOS system, when software of the iOS system is connected to a target device, another application program installed in the terminal cannot obtain a MAC address of the target device. Therefore, the terminal queries the target device, and the target device returns an feature description to the terminal. For example, a read feature description is returned to the terminal by adding the read feature description with a service uuid, where an identifier uuid of the read feature description is 0xFEC9, and its content includes a 6-byte MAC address. The application program installed in the terminal reads the feature description, to determine the MAC address of the target device. In this way, when being connected to a plurality of devices, the terminal may distinguish between the target device and another device according to the MAC address.

The feature description of the target device may be configured according to the function of the target device. For example, if the target device is a pedometer, two feature descriptions may be included. One feature description is a real-time step count information feature description, including a step count, a distance, calories, and the like. The other feature description is a movement goal feature description. A step count profile formed by the two feature descriptions is carried under the service uuid (Universally Unique Identifier) of the service provided by the target device in the broadcast packet. Generally, if the target device is capable of providing one or more services, the step count profile includes the one or more services. Each service may include one or more feature descriptions.

The query module 102 is configured to query operation permission regarding the feature description.

In this embodiment of this application, the operation permission for the feature description is queried. The operation permission includes at least one of a write permission (write) for the feature description, a read permission (read) for the feature description, and a permission (indicate/notify) for being informed automatically regarding an update of the feature description. In some examples, the target device automatically informs an update of the feature description by automatically indicating the update or notifying the update. In some examples, the update of the feature description is more reliably communicated from the target device to the terminal by indicating than by notifying.

Herein, still using the example in which the target device is the pedometer, and the pedometer uses feature descriptions including the real-time step count information feature description and the movement goal feature description.

The following Table 1 describes the real-time step count information feature description. In Table 1, a name of the real-time step count information feature description is current pedometer measurement, and an identifier uuid is 0xFEA1. Operation permission of a user for the feature description includes a read permission and a permission for being informed automatically regarding an update of the feature description. Real-time step count information includes a step count, a distance, and calories.

TABLE 1

| | |
|---|---|
| Feature name | current_pedometer_measurement |
| uuid | 0xFEA1 |
| Operation permission | Read; one or both of Indicate and Notify may be supported |
| Whether mandatory | Mandatory |
| Description | Real-time step count information, including a step count, a distance, and calories |

The following Table 2 describes the movement goal feature description. In Table 2, a name of the movement goal feature description is target, and an identifier uuid is 0xFEA2. Operation permission of a user for the feature description includes a read permission, a write permission, and a permission for automatically notifying an update of the feature description.

TABLE 2

| | |
|---|---|
| Feature name | target |
| uuid | 0xFEA2 |
| Operation permission | Read; Write; and Indicate |
| Whether mandatory | Optional |
| Description | Movement goal |

The operation permission of the terminal for each feature description of the target device may be preset by the target device. When exchanging information with the target device by using the communication connection, the terminal may read the feature description and the operation permission that are preset in the target device. Certainly, the feature description of the target device and the operation permission for the feature description may alternatively be preset in the application program of the terminal. When the feature description of the target device is detected, the operation permission for the feature description of the target device may be queried in the application program of the terminal.

In this embodiment of this application, a value of the real-time step count information feature description current pedometer measurement may be formed by the following four parts, as shown in Table 3.

TABLE 3

| Value | Type | Description |
|---|---|---|
| Flag | Uint8 | 0x01: Step count (mandatory) |
| | | 0x02: Distance (optional) |
| | | 0x04: Calories (optional) |
| | | For example, 0x05 indicates that a step count and calories are included |
| StepCount | Uint24 | Step count |
| StepDistancer | Uint24 | Distance, in meters |
| StepCalorie | Uint24 | Calories |

A flag bit Flag is used to mark whether a step count StepCount, a distance StepDistancer, and calories StepCalorie are mandatory or optional. The step count and the calories are optional, that is, the step count and the calories may be included or not included in the value of the real-time step count information feature description returned by the target device to the terminal. If the value of the real-time step count information feature description returned by the target device to the terminal includes only the step count, a returned value is: 01 (value: 0x01, which indicates a step count) 10 27 00 (value: 0x2710, which is a hexadecimal number and indicates 10000 steps). If the value of the real-time step count information feature description returned by the target device to the terminal includes the step count and the distance, a returned value is: 03 (value: 0x03, which indicates a step count and a distance) 10 27 00 (which is a hexadecimal number and indicates 10000 steps) 70 17 00 (value: 0x1770, which is a hexadecimal number and indicates 6000 meters). The rest can be deduced by analogy.

In this embodiment of this application, a value of the movement goal feature description target may be formed by values in the following table, as shown in Table 4.

TABLE 4

| Value | Type | Description |
|---|---|---|
| Flag | Uint8 | 0x01: Step count (mandatory) |
| StepCount | Uint24 | Step count |

A flag bit Flag is used to mark that a step count StepCount is mandatory. If a movement goal is 10000 steps, the value of the target is: 01 (value: 0x01, which indicates a step count) 10 27 00 (value: 0x2710, which is a hexadecimal number and indicates 10000 steps).

In some examples, if the terminal writes the value of the movement goal target into the target device, the target device will update the value. In some examples, if the target device updates the value of the movement goal target, the terminal will be notified.

The operation module 103 is configured to control the function using the feature description according to the operation permission regarding the feature description.

In this embodiment of this application, the operation module 103 may perform an operation on the feature description of the target device according to the operation permission for the feature description, to control the function corresponding to the feature description.

In this embodiment of this application, if the operation permission includes the permission for being informed automatically regarding an update of the feature description, the operation module 103 is specifically configured to subscribe to the feature description from the target device according to the operation permission, so that when the target device updates the feature description, the terminal is automatically informed.

In this embodiment of this application, if the operation permission for a particular feature description includes the permission for being informed automatically regarding an update of the feature description, the terminal may subscribe to the feature description from the target device, so that the target device informs the terminal in time when the feature description is updated. Generally, a device includes many feature descriptions, and a user can subscribe to a corresponding feature description according to a requirement of the user. In this way, when the subscribed feature description is updated, the target device automatically informs the terminal.

For example, for the real-time step count information feature description in the pedometer, if a user subscribes to the feature description, when the real-time step count information feature description is updated, the target device synchronizes the updated information with the terminal and informs the user. There are various manners for informing the update of a feature description. For example, the updated information may be displayed on an interface of the pedometer, and displayed content includes, but is not limited to, a step count, a distance, and calories. Similarly, the user may also subscribe to the movement goal feature description.

When updating the feature description, the target device automatically synchronizes an updated value with the terminal and notifies the user.

Figure 5:
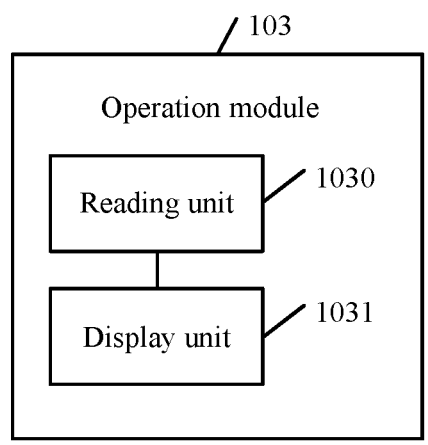
FIG. 5 is a block diagram of an operation module according to an embodiment of this application.

In this embodiment of this application, if the operation permission includes the read permission for the feature description, the operation module 103 may include a reading unit 1030 and a display unit 1031, as shown in FIG. 5.

The reading unit 1030 is configured to read the feature description according to the operation permission.

The display unit 1031 is configured to display, on the terminal, information about the function corresponding to the feature description.

In this embodiment of this application, if the operation permission for a particular feature description includes the read permission for the feature description, the terminal may read the feature description according to the operation permission, and displays the information about the function corresponding to the feature description on the terminal.

For example, when finding that the terminal has read permission for the real-time step count information feature description in the pedometer, the terminal may send a read request to the target device according to the read permission, to read current real-time step count information of target device. The real-time step count information includes, but is not limited to, a step count, a distance, calories, and the like. The terminal may display the read real-time step count information, to help the user to learn a current movement status. Similarly, if the terminal has read permission for the movement goal feature description, the terminal may read a value of the movement goal from the target device, and display the value of the movement goal.

In this embodiment of this application, if the operation permission includes the write permission for the feature description, the operation module 103 is specifically configured to: when receiving a control instruction associated with the feature description, perform a write operation on the feature description according to the operation permission regarding the feature description and the control instruction, so that the target device controls the function corresponding to the control instruction.

In this embodiment of this application, if the operation permission for a particular feature description includes the write permission for the feature description, for example, the movement goal feature description in the pedometer, the terminal has the write permission for the feature description. When receiving the control instruction associated with the feature description, the terminal performs the write operation on the feature description in the target device according to the write permission for the feature description and the control instruction, so that the target device controls the function corresponding to the control instruction.

For example, when finding that the terminal has read permission for the movement goal feature description in the pedometer, the terminal may send a read request to the target device according to the read permission, to obtain a value of a movement goal that is currently stored in the target device. When the terminal finds that the terminal has write permission for the feature description and the user needs to reset the movement goal in the target device by using the terminal, the user initiates a control instruction associated with the movement goal feature description to the terminal, the control instruction carrying a value of a new movement goal. In some examples, the terminal sends the value of the new movement goal to the target device; and the target device updates the stored value of the movement goal. In this embodiment of this application, a manner of initiating the control instruction by the user to the terminal may be that the user performs a setting operation on the feature description by using a touchscreen of the terminal.

The terminal performs a modification operation on the movement goal feature description in the target device according to the control instruction and the write permission for the movement goal, to modify the movement goal feature description to the value of the movement goal that is carried in the control instruction, so that the movement goal in the target device is updated.

In this embodiment of this application, the device control apparatus may further include a receiving module 104 and a matching module 105.

The receiving module 104 is configured to receive a broadcast packet of the target device, the broadcast packet carrying a target identifier of the target device.

In this embodiment of this application, the target device broadcasts the broadcast packet. The broadcast packet carries the target identifier of the target device, and the target identifier may include a MAC address, a network address, or the like of the target device.

The matching module 105 is configured to match the target identifier with an identifier in a preset identifier library.

The establishment module 100 is specifically configured to: when the preset identifier library has an identifier matching the target identifier, establish the close-range communication connection between the terminal and the target device.

A device marked by the identifier in the preset identifier library is an authorized device.

In this embodiment of this application, a new security mechanism is further added based on a security mechanism of an original Bluetooth protocol, that is, whether the target device is an authorized device is determined by matching the target identifier of the target device with the identifier in the preset identifier library by the matching module 105. Because a device marked by the identifier in the preset identifier library is an authorized device, if the preset identifier library has the identifier matching the target identifier, it indicates that target device is an authorized device, so that the terminal can establish the close-range communication connection with the target device.

Each device manufacturer records in advance, on an html page provided by the manufacturer, an identifier of a device that the manufacturer produces. In this way, the identifier of the device is automatically recorded in a preset identifier library of a back-end service platform (e.g., on a server).

After receiving the broadcast packet of the target device, the terminal verifies whether the target device is authorized in the preset identifier library of the back-end service platform. If it is found that the identifier of the target device is not recorded in the preset identifier library, it is considered that the target device is unauthorized. In addition, if an identifier has been embezzled in a large scale by a pirating manufacturer, a blacklist may also be configured in the back-end service platform, to disable a device marked by the identifier.

In this embodiment of this application, a close-range communication connection between a terminal and a target device is established; at least one feature description of the target device is obtained through the close-range communication connection, a feature description corresponding to a function of the target device; operation permission for each of the at least one feature description is queried; and the function is controlled using the feature description according to the operation permission regarding the feature description. By means of this manner, the function corresponding to the feature description can be controlled only by the terminal by performing an operation on the feature description of the target device without needing to develop a back-end service platform by a manufacturer who develops the target device, thereby saving device resources, simplifying a communications network structure, and simplifying a control manner.

In some embodiments, one or more of various modules described in the present disclosure are implemented as software instructions executed by a processor, hardware circuitry, or a combination thereof.

Figure 6:
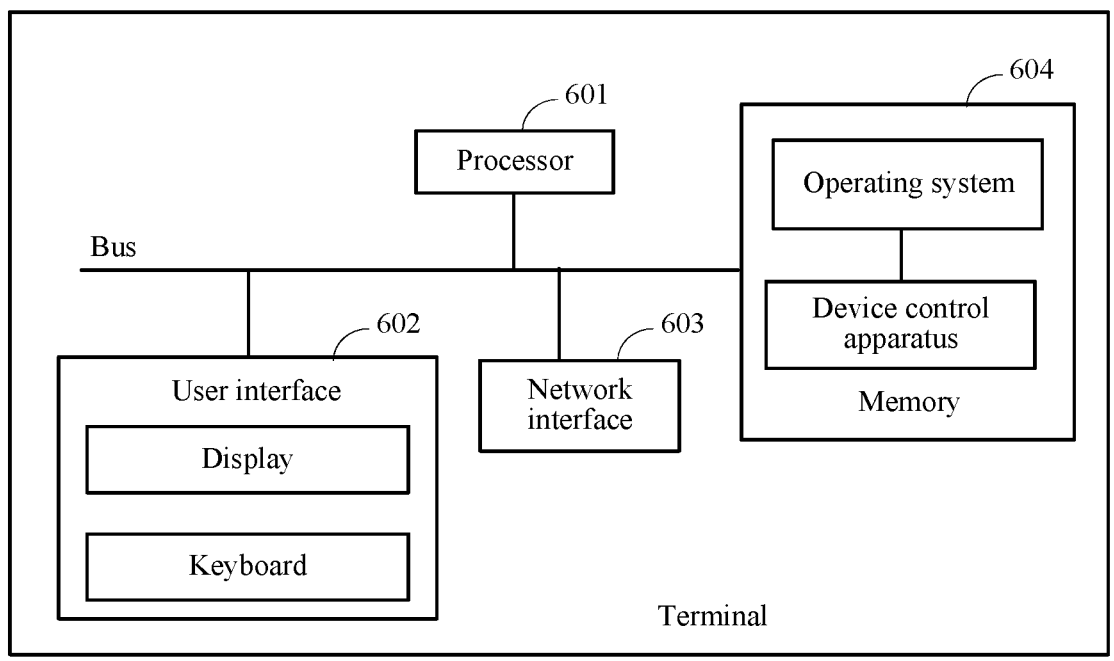
FIG. 6 is a block diagram of a terminal according to an embodiment of this application.

FIG. 6 is a block diagram of a terminal according to an embodiment of this application. The terminal may be configured to perform corresponding steps of the method processes shown in the foregoing FIG. 1 and FIG. 2. Referring to FIG. 6, the internal structure of the terminal may include, but is not limited to, a processor 601, a user interface 602, a network interface 603, and a memory 604. The processor 601, the user interface 602, the network interface 603, and the memory 604 in the terminal may be connected by using a bus or in another manner. In FIG. 6 shown in this embodiment of this application, a bus connection is used as an example.

The user interface 602 is a medium that implements an interaction and information exchange between a user and the terminal. A specific embodiment of the user interface 602 may include a display configured for outputting, a keyboard configured for inputting, and the like. The keyboard herein may be a physical keyboard, or may be a touchscreen virtual-keyboard, or may be a keyboard combining the physical keyboard and the touchscreen virtual-keyboard. The processor 601 (or also referred to as a central processing unit (CPU)) is the computing core and the control core of the terminal. The processor 601 may parse various types of instructions in the terminal and process various types of data of the terminal, for example, read a computer readable instruction stored in the memory 604 to perform the method steps provided in the embodiments shown in the foregoing FIG. 1 to FIG. 3. The memory 604 (such as a memory) is a volatile or non-volatile computer readable storage medium, is a storage device of the terminal, and is configured to store a computer readable instruction such as a program and data. The memory 604 herein may include a built-in memory of the terminal, and may certainly further includes an expanded memory supported by the terminal. The memory 604 provides storage space. The storage space stores an operating system of the terminal. The operating system may include, but not limited to, a Windows system (an operating system), an Android system (a mobile operating system), an iOS system (a mobile operating system), and the like. The storage space of the memory stores a device control apparatus. The device control apparatus may be an Internet application program running in the terminal, and may include, but is not limited to, an SNS application program, an instant messaging application program, and the like.

In this embodiment of this application, the terminal performs the corresponding steps of the method processes shown in the foregoing FIG. 1 and FIG. 2 by running the device control apparatus in the memory 604.

In this embodiment, the device control apparatus in the terminal may include:

an establishment module, configured to establish a close-range communication connection between the terminal and a target device;

an obtaining module, configured to obtain, based on the close-range communication connection, at least one feature description of the target device, a feature description corresponding to a function of the target device;

a query module, configured to query operation permission for each of the at least one feature description; and an operation module, configured to perform an operation on the feature description according to the operation permission, to control the function corresponding to the feature description.

The operation permission includes at least one of a write permission for the feature description, a read permission for the feature description, and a permission for automatically notifying an update of the feature description.

In this embodiment of this application, if the operation permission includes the permission for being informed automatically regarding an update of the feature description, the operation module is specifically configured to subscribe to the feature description from the target device according to the operation permission, so that when the target device updates the feature description, the terminal is automatically notified.

In this embodiment of this application, if the operation permission includes the read permission for the feature description, the operation module includes:

a reading unit, configured to read the feature description according to the operation permission; and a display unit, configured to display, on the terminal, information about the function corresponding to the feature description.

In this embodiment of this application, if the operation permission includes the write permission for the feature description, the operation module is specifically configured to: when receiving a control instruction associated with the feature description, perform a write operation on the feature description according to the operation permission for the feature description and the control instruction, so that the target device controls the function corresponding to the control instruction.

The device control apparatus further includes:

a receiving module, configured to receive a broadcast packet of the target device, the broadcast packet carrying a target identifier of the target device; and a matching module, configured to match the target identifier with an identifier in a preset identifier library, where the establishment module is specifically configured to: if the preset identifier library has an identifier matching the target identifier, establish the close-range communication connection between the terminal and the target device, where a device marked by the identifier in the preset identifier library is an authorized device.

In this embodiment of this application, the target device includes any one of a pedometer, a Bluetooth light, and a Bluetooth scale; and if the target device is the pedometer, the feature description includes real-time step count information and/or a movement goal, where operation permission for the real-time step count information includes read permission for the real-time step count information and permission for automatically notifying an update of the real-time step count information; and operation permission for the movement goal includes write permission for the movement goal, read permission for the movement goal, and permission for automatically notifying an update of the movement goal.

A person of ordinary skill in the art may understand that all or some of the processes in the methods of the foregoing embodiments may be implemented by a computer program instructing relevant hardware. The program may be stored in a computer readable storage medium. The program corresponding to the device control apparatus shown in FIG. 4 and FIG. 5 may be stored in the readable storage medium of the terminal, and is executed by at least one processor in the terminal, to implement the foregoing device control methods. The methods include the processes in the method embodiments in FIG. 1 to FIG. 3. The storage medium may be a magnetic disk, an optical disc, a read-only memory (ROM), a random access memory (RAM), or the like. In some embodiments, the storage medium includes a non-transitory storage medium.

Also, the feature description and the corresponding function described in the present disclosure are merely illustrated as non-limiting examples. In some embodiments, various numbers of feature descriptions of the target device corresponding to respective functions of the target device are obtained and the functions are controlled in a manner as described in the present disclosure.

What is disclosed above is merely exemplary embodiments of this application, and certainly is not intended to limit the scope of the claims of this application. Therefore, variations made in accordance with the claims of this application shall fall within the scope of this application.

What is claimed is:

1. A device control method, comprising:
   receiving, by a terminal, a broadcast packet from a target device, the broadcast packet carrying a target identifier of the target device, the target device being identifiable by the target identifier;
   determining, by the terminal, whether the target identifier matches a device identifier in a preset identifier library from a server; and
   in a case that the target identifier is determined to match the device identifier in the preset identifier library:
      establishing a close-range communication connection between the terminal and the target device;
      obtaining, by the terminal from the target device through the established close-range communication connection, a feature description of the target device, the feature description corresponding to a function of the target device;
      querying, by the terminal from the feature description, an operation permission regarding the feature description; and
      controlling, by the terminal, the function using the feature description according to the operation permission regarding the feature description,
   wherein the operation permission comprises at least one of a write permission for the feature description, a read permission for the feature description, and a permission for being informed automatically regarding an update of the feature description.

2. The method according to claim 1, wherein
   the operation permission comprises the permission for being informed automatically regarding the update of the feature description, and
   the controlling the function using the feature description comprises:
      subscribing to the feature description from the target device according to the operation permission, so that when the target device updates the feature description, the terminal is automatically informed.

3. The method according to claim 1, wherein
   the operation permission comprises the react permission for the feature description, and the controlling the function using the feature description comprises:
      reading the feature description according to the operation permission; and
      displaying, on the terminal, information about the function corresponding to the feature description.

4. The method according to claim 1, wherein
   the operation permission comprises the write permission for the feature description, and
   the controlling the function using the feature description comprises:
      when receiving a control instruction associated with the feature description, performing a write operation on the feature description according to the operation permission regarding the feature description and the control instruction, so that the target device controls the function corresponding to the control instruction.

5. The method according to claim 1, wherein the preset identifier library specifies identifiers of authorized devices.

6. The method according to claim 1, wherein the target device is a pedometer, a Bluetooth light, or a Bluetooth scale.

7. The method according to claim 1, wherein
   the target device is a pedometer,
   the feature description is a real-time step count information feature description or a movement goal feature description,
   when the feature description is the real-time step count information feature description, the operation permission includes the read permission for the real-time step count information and the permission for being informed automatically regarding an update of the real-time step count information, and
   when the feature description is the movement goal feature description, the operation permission includes the write permission for the movement goal, the read permission for the movement goal, and the permission for being informed automatically regarding an update of the movement goal.

8. A terminal, comprising:
   a network interface; and
   a processor coupled with the network interface, the processor being configured to:
      receive, through the network interface, a broadcast packet from a target device, the broadcast packet carrying a target identifier of the target device, the target device being identifiable by the target identifier;
      determine whether the target identifier matches a device identifier in a preset identifier library from a server; and
   in a case that the target identifier is determined to match the device identifier in the preset identifier library:
      establish through the network interface a close-range communication connection between the terminal and the target device;
      obtain, from the target device through the established close-range communication connection, a feature description of the target device, the feature description corresponding to a function of the target device;
      query, from the feature description, an operation permission regarding the feature description; and
      control the function using the feature description according to the operation permission regarding the feature description,
   wherein the operation permission comprises at least one of a write permission for the feature description, a read permission for the feature description, and a permission for being informed automatically regarding an update of the feature description.

9. The terminal according to claim 8, wherein
the operation permission comprises the permission for being informed automatically regarding the update of the feature description, and
the processor is configured to:
subscribe to the feature description from the target device according to the operation permission, so that when the target device updates the feature description, the terminal is automatically informed.

10. The terminal according to claim 8, wherein
the operation permission comprises the read permission for the feature description, and
the processor is configured to:
read the feature description according to the operation permission; and
display, on the terminal, information about the function corresponding to the feature description.

11. The terminal according to claim 8, wherein
the operation permission comprises the write permission for the feature description, and
the processor is configured to:
when receiving a control instruction associated with the feature description, perform a write operation on the feature description according to the operation permission regarding the feature description and the control instruction, so that the target device controls the function corresponding to the control instruction.

12. The terminal according to claim 8, wherein the preset identifier library specifies identifiers of authorized devices.

13. The terminal according to claim 8, wherein the target device is a pedometer, a Bluetooth light, or a Bluetooth scale.

14. The terminal according to claim 8, wherein
the target device is a pedometer,
the feature description is a real-time step count information feature description or a movement goal feature description,
when the feature description is the real-time step count information feature description, the operation permission includes the read permission for the real-time step count information and the permission for being informed automatically regarding an update of the real-time step count information, and
when the feature description is the movement goal feature description, the operation permission includes the write permission for the movement goal, the read permission for the movement goal, and the permission for being informed automatically regarding an update of the movement goal.

15. A non-transitory computer readable storage medium storing a computer readable program which, when executed by a processor of a terminal, causes the processor to perform:
receiving a broadcast packet from a target device, the broadcast packet carrying a target identifier of the target device, the target device being identifiable by the target identifier;
determining whether the target identifier matches a device identifier in a preset identifier library from a server; and
in a case that the target identifier is determined to match the device identifier in the preset identifier library:
establishing a close-range communication connection between the terminal and the target device;
obtaining, from the target device through the established close-range communication connection, a feature description of the target device, the feature description corresponding to a function of the target device;
querying, from the feature description, an operation permission regarding the feature description; and
controlling, by the terminal, the function using the feature description according to the operation permission regarding the feature description,
wherein the operation permission comprises at least one of a write permission for the feature description, a read permission for the feature description, and a permission for being informed automatically regarding an update of the feature description.

16. The non-transitory computer readable storage medium according to claim 15, wherein
the operation permission comprises the permission for being informed automatically regarding the update of the feature description, and
the controlling the function using the feature description comprises:
subscribing to the feature description from the target device according to the operation permission, so that when the target device updates the feature description, the terminal is automatically informed.

17. The non-transitory computer readable storage medium according to claim 15, wherein
the operation permission comprises the read permission for the feature description, and
the controlling the function using the feature description comprises:
reading the feature description according to the operation permission; and
displaying, on the terminal, information about the function corresponding to the feature description.

18. The non-transitory computer readable storage medium according to claim 15, wherein
the operation permission comprises the write permission for the feature description, and
the controlling the function using the feature description comprises:
when receiving a control instruction associated with the feature description, performing a write operation on the feature description according to the operation permission regarding the feature description and the control instruction, so that the target device controls the function corresponding to the control instruction.

19. The non-transitory computer readable storage medium according to claim 15, wherein the preset identifier library specifies identifiers of authorized devices.

20. The non-transitory computer readable storage medium according to claim 15, wherein
the target device is a pedometer,
the feature description is a real-time step count information feature description or a movement goal feature description,
when the feature description is the real-time step count information feature description, the operation permission includes the read permission for the real-time step count information and the permission for being informed automatically regarding an update of the real-time step count information, and
when the feature description is the movement goal feature description, the operation permission includes the write permission for the movement goal, the read permission for the movement goal, and the permission for being informed automatically regarding an update of the movement goal.

* * * * *